Patented May 30, 1939

2,160,119

UNITED STATES PATENT OFFICE 2,160,119

PIGMENT PASTES

Karl Brodersen, Dessau in Anhalt, Germany, assignor to General Aniline Works, Inc., New York, N. Y., a corporation of Delaware No Drawing. Application December 31, 1936, Serial No. 118,571. In Germany January 6, 1936

2 Claims. (Cl. 134—58)

The present invention relates to a process for producing aqueous dye-pigment pastes and to the products obtainable according to this process.

It is known that aqueous pastes of dye pigments as they are manufactured and used for many purposes, for instance, for printing wall papers, have a greater coloring capacity than that of the powders made by drying them. Even the addition of a wetting agent in the production of a paste from the powder does not essentially improve the coloring capacity. For avoiding an unnecessary transportation of water involved by marketing the aqueous pastes and also any damage by frost and to facilitate more convenient packing and apportioning in use it is very desirable that a solid product should be marketed.

This invention is based on the observation that pulverulent dried pigment pastes of appearance and coloring power practically equal to those of the aqueous pastes are obtainable when the paste is produced in the presence of a quaternary organic base or a salt thereof which contains at least one aliphatic or cycloaliphatic radicle having more than 5 carbon atoms. It is immaterial what in the construction of this base or salt may be in detail; the carbon chain may, for example, be interrupted by an atom or atom grouping other than carbon or it may be branched or contain substituents.

The invention consists, therefore, in producing aqueous pastes or suspensions of pigment dyes which have a high coloring capacity by using as a dispersing agent a quaternary ammonium compound the constitution of which comprises an aliphatic or a cycloaliphatic radicle having more than 5 carbon atoms. Examples of suitable compounds are as follows:

Dodecyltrimethylammonium chloride:

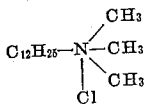

Stearyldioxyethylmethylammonium methyl sulfate:

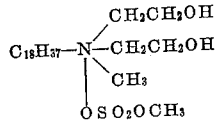

Stearyl pyridinium chloride:

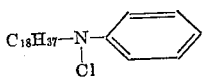

Oleyl - poly - glycol - dimethylammonium methyl sulfate:

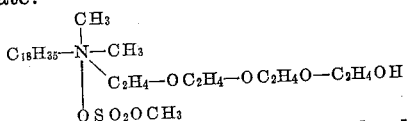

Trimethylammonium acetic acid dodecyl ester chloride:

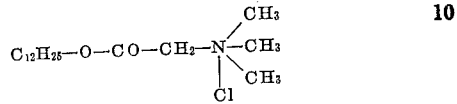

The body having cation activity may be mixed with the powdered pigment itself or with the aqueous substratum which is used for producing a paste.

The following examples illustrate the invention, the parts being by wieght:

*Example 1.*—2.5 parts of a dye pigment which is of particularly poor wetting capacity, for example Hansa Yellow 5 G, are made into a paste with 2.5 parts of an aqueous solution of 10 per cent. strength of stearyl pyridinium chloride and after addition of further 75 parts of water the paste is allowed to stand overnight and then passed through a sieve. There is thus obtained a completely uniform paste which corresponds with the original dye paste in dispersion and as a size color applied with the usual substratum is equivalent in color strength to the original paste.

*Example 2*

| | Parts |
|---|---|
| Dimethylbenzylpalmitylammonium chloride | 3 |
| An alkyd resin emulsion of 50 per cent. strength | 100 |
| Zinc white | 100 |
| Water | 100 | are thoroughly stirred together.

In this manner a completely homogeneous painting material is obtained while without addition of the ammonium compound the dispersion of the pigment in the alkyd resin emulsion is essentially worse.

It is obvious that my invention is not limited to the foregoing examples or to the specific details given therein.

Instead of the ammonium compound mentioned above, there may be used trimethyloctylammonium chloride or dimethyl butyloleylammonium chloride or similar compounds. Furthermore, the ammonium compounds are useful for the purpose set forth which contain other high molecular alkyl radicles which correspond to the carboxylic acids contained in natural fats, oils or waxes. Other ammonium compounds bearing free hydroxy groups or an etherified or esterified hydroxy group, are mentioned above.

What I claim is:

1. Aqueous pigment pastes consisting of a pigment, a dispersing agent consisting of a quaternary ammonium compound which contains a radical with more than 5 carbon atoms, and water.

2. Aqueous pigment pastes consisting of a pigment, a dispersing agent consisting of a pyridinium compound, and water.

KARL BRODERSEN.